United States Patent [19]

Wine

[11] Patent Number: 4,475,759
[45] Date of Patent: Oct. 9, 1984

[54] PICKUP TRUCK HAVING A STREAMLINING TAILGATE

[76] Inventor: Jerry P. Wine, 1973 E. Vinedo La., Tempe, Ariz. 85284

[21] Appl. No.: 402,967

[22] Filed: Jul. 29, 1982

[51] Int. Cl.³ .............................................. B62D 25/00
[52] U.S. Cl. ....................................... 296/1 S; 296/50
[58] Field of Search ................... 296/1 S, 50, 55, 56, 296/1 C, 51, 57 R

[56] References Cited

U.S. PATENT DOCUMENTS

| | | | |
|---|---|---|---|
| 216,464 | 6/1879 | Smith | 296/56 |
| 1,259,088 | 3/1918 | Enright | 296/56 |
| 3,455,594 | 7/1959 | Hall et al. | 296/1 S |
| 4,165,118 | 8/1979 | Jensen | 296/50 |
| 4,353,589 | 10/1982 | Hartberg | 296/50 |
| 4,372,601 | 2/1983 | Smith | 296/50 |

OTHER PUBLICATIONS

"Airshield" advertisement by Rudkin-Wiley Corporation.

Primary Examiner—David A. Scherbel
Assistant Examiner—Russell D. Stormer
Attorney, Agent, or Firm—M. David Shapiro

[57] ABSTRACT

The invention comprises an improvement in pickup truck tailgates and the mechanism for operating such tailgates which allows the tailgate to be operated from essentially a conventional closed vertical position to a plurality of other positions which may provide negative lift to the rear of the pickup truck vehicle or minimize the drag coefficient of the vehicle. This is accomplished with a mechanism which allows the tailgate to be carried substantially inside of the pickup truck bed enclosure with air flow over the tailgate and between the tailgate and the floor of the pickup truck bed. The angle between the tailgate and the truck bed is adjustable to provide desired lift and drag minimization functions.

7 Claims, 4 Drawing Figures

CROSS SECTION OF TAILGATE

OPTIONAL METHOD

PICKUP TRUCK HAVING A STREAMLINING TAILGATE

FIELD OF INVENTION

This invention relates to vehicles with pickup bed tailgates and primarily used to improve aerodynamics thereby improving gas mileage and performance.

DISCUSSION OF PRIOR ART

Heretofore, methods to improve aerodynamics were: (1) to put a pick-up bed cover hereon called a tonneau cover, eliminating drag caused by the tailgate. (2) to put a streamlined camper shell causing the same effect as the tonneau cover. (3) to drop the tailgate to the lowered position. (4) to remove the tailgate completely. Test results and further information can be referenced in PICKUP VAN & 4WD June 1982 issue titled "Aerodynamics —Is your truck a drag" Tests show that gas mileage can be improved by reducing tailgate drag by using the above prior art. FIG. 1 depicts the air flow and the associated drag created by a tailgate in the raised position. The action is similar to a parachute attached to a car for means to slow or stop the vehicle.

OBJECTS

Accordingly several objects of my invention are: Improvement on gas mileage and truck performance can be achieved with use of the invention. Once the said invention is installed, it is not necessary to add items such as tonneau covers or camper shells of streamlined structure to improve vehicle performance. Removal of the tailgate from the vehicle is not necessary with use of said invention. Such removal or addition is not necessary, providing convenience to the user. The said invention can be used to reduce lift forces with improvements on rear tire traction. The invention can have an added advantage of increasing review vision, originally obstructed by part of the tailgate. Further objects and advantages of my invention will become apparent from a consideration of the drawings and ensuing description thereof.

DRAWINGS

DESCRIPTION

Figure 1:
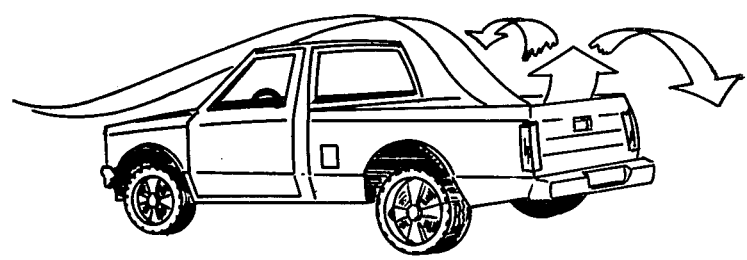
FIG. 1 depicts the airflow disruption created by the current tailgate design.
Figure 2:
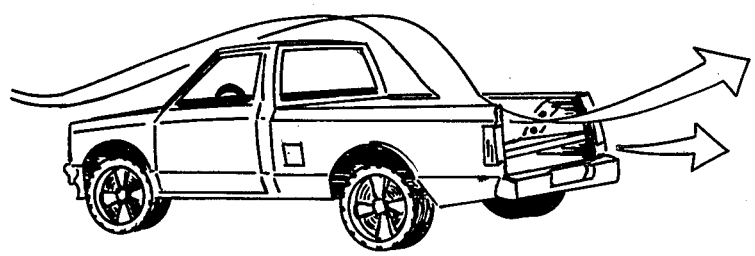
FIG. 2 is the view of the invention, the Foilgate shown with a simplified view of airflow pattern.
Figure 3:
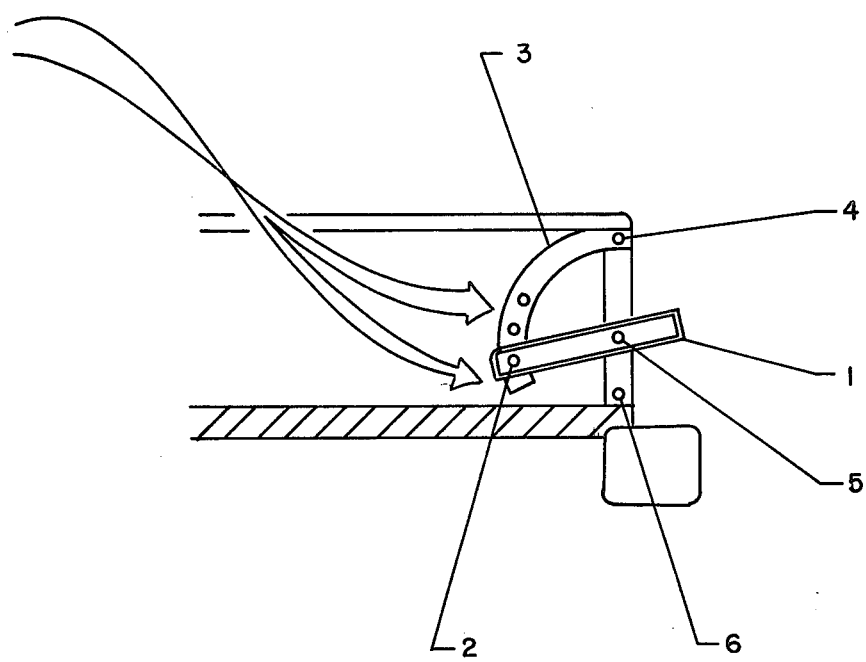
FIG. 3 is an example of the means to accomplish the invention which will be called the "Foilgate."
Figure 4:
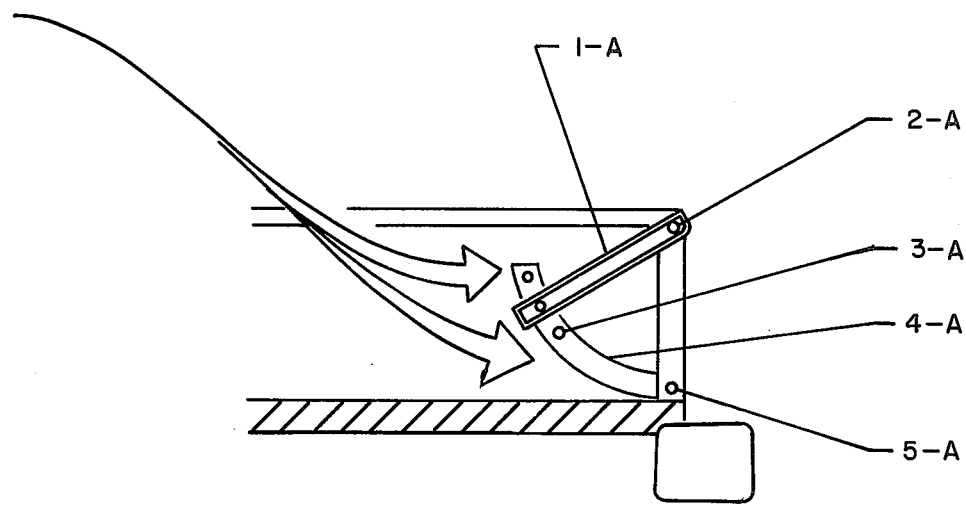
FIG. 4 is an alternative method to accomplish the said invention.

Hereupon the invention will be called the "foilgate." The foilgate is displayed on FIG. 2. The main element of the foilgate is the tailgate 1 modified to provide low air resistance otherwise known as air drag. Many conventional tailgates on standard trucks have an adaquate structure to perform as a foilgate. FIG. 3 is one example of the means to construct the tailgate. The device comprises two detachable pivot rods 5 and 6, a spring loaded locking pin 2 that fits between the guide rail 3, tailgate 1 and other miscellaneous parts. The tailgate 1 can be more streamlined than as shown in FIG. 3. The centermost pivot rod 5 is positioned preferably close to the center of gravity of the tailgate 1, such that when the locking pin 2 and the bottom pivot 6 is released, it takes minimal effort to guide the tailgate 1 to the desired near horizontal position. The guide rail 3 has several holes 4 for the spring loaded pin 2 to lock. One of the holes 4 is located at the point the tailgate will lock at the conventional vertical position. One or more of the holes can be used to lock the tailgate at several optional angles as desired by the user. Situating the guide rail hole such that the tailgate is in near horizontal position such that air drag would be reduced, would be ideal for the user with the desire to increase gas mileage. FIG. 2 depicts the foilgate in that position. Another hole can be placed such that the position of the tailgate 1 will reduce rear end lift, and so on. To lower the tailgate 1 such as in a conventional tailgate, the spring loaded pin 2 is released and the centermost detachable pivot 5 is released, then the tailgate 1 can be lowered. Other modifications are possible to facilitate user convenience. FIG. 4 displays an alternative approach. The primary difference is that the guide rail 5a is on the bottom and the bottom detachable pivot acts also as the spring loaded pin mentioned in the earlier example. The previous spring loaded pin is now a detachable pivot point. In manufacture of the spring loaded pin and the detachable pivot, it is possible to use the same device since the detachable pivot can be of a spring loaded pin nature. The example on pin 4 has a possible disadvantage in the that pivoting action is not at the center of gravity, requiring more effort to place the tailgate into position, however this should not be significantly more than raising or lowering a conventional tailgate. The advantage of this design is that the driver can have a better view of obstacles in back of truck, a convenience when backing up into a stall. As another example a conventional pickup truck can be modified to accommodate the invention. It is prefered that the tailgate has the folding restraint arms used when the tailgate is lowered. These arms can effectively be used as the guiding rail device, to raise the tailgate above and into pickup bed. Such modification will also comprise a means to detach the hinge or pivot and a means to lock the tailgate in place.

OPERATION

The basic foilgate is displayed on FIG. 2. The foilgate is structured such that the tailgate can be maneuvered in position to become streamlined, eliminating the drag associated with a conventional tailgate. A means to provide such streamlining is shown in FIG. 3. The invention is used primarily when the pick-up bed is empty or when a small tool box is attached next to the cab. In this situation, the tailgate functions with no apparent purpose other than creating unwanted drag. When a pick-up bed is empty, because of the structure of the vehicle, less weight would usually be placed on the rear wheel. This situation is not ideal for rear tire traction. If needed, the foilgate, by means of the design of the tailgate or positioning the angle of the foilgate or both, the invention can produce negative lift forces, thereby increasing rear tire traction when the vehicle is in movement in the forward direction.

While the above description contains many specificities, these should not be construed as limitations on the scope of the invention, but rather as an exemplification of one preferred embodiment thereof. Many other variations are possible, for example FIG. 4. Accordingly, the scope of the invention should be determined not by the embodiment illustrated, but by the appended claims and their legal equivalents.

What is claimed is:

1. An improved tailgate apparatus for use on a pickup truck, the pickup truck having a partially enclosed bed portion, said enclosure comprising two sides and a floor, the improved apparatus comprising:

a tailgate, said tailgate being adaptable for being rigidly and readily positioned in any of a plurality of positions with respect to the floor and positioned substantially between the sides of an after portion of the partially enclosed pickup bed, at least one of said plurality of positions being a closed position for providing closure of the after end of the pickup bed, and at least one open position allowing substantial air flow between the tailgate and the floor of the pickup bed to provide an airfoil effect at the after end of the pickup truck; and means for adjusting and holding said adaptable tailgate in each of said plurality of positions.

2. The improved tailgate apparatus according to claim 1 wherein said tailgate is a modified conventional tailgate.

3. The improved tailgate apparatus according to claim 2 wherein said plurality of tailgate positions comprises a position which provides closure of the after end of the pickup bed and at least one position which adapts said tailgate to provide an airfoil effect at the after end of the pickup truck.

4. The improved tailgate apparatus according to claim 1 wherein said airfoil effect affords at least negative lift.

5. The improved tailgate apparatus according to claim 3 wherein said airfoil effect affords at least negative lift.

6. The improved tailgate apparatus according to claim 1 wherein said airfoil effect acts to minimize drag forces on the pickup truck.

7. The improved tailgate apparatus according to claim 3 wherein said airfoil effect acts to minimize drag forces on the pickup truck.

* * * * *